US008879560B2

(12) United States Patent
Rahim

(10) Patent No.: US 8,879,560 B2
(45) Date of Patent: *Nov. 4, 2014

(54) REORDER ENGINE WITH ERROR RECOVERY

(75) Inventor: Rami Rahim, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 415 days.

This patent is subject to a terminal disclaimer.

(21) Appl. No.: 13/149,269

(22) Filed: May 31, 2011

(65) Prior Publication Data

US 2011/0228784 A1    Sep. 22, 2011

Related U.S. Application Data

(63) Continuation of application No. 12/565,568, filed on Sep. 23, 2009, now Pat. No. 7,974,291, which is a continuation of application No. 11/684,394, filed on Mar. 9, 2007, now Pat. No. 7,613,192, which is a continuation of application No. 10/024,553, filed on Dec. 21, 2001, now Pat. No. 7,209,482.

(51) Int. Cl.
| H04L 12/54 | (2013.01) |
| H04L 12/823 | (2013.01) |
| H04L 12/801 | (2013.01) |
| H04L 12/861 | (2013.01) |
| H04L 12/841 | (2013.01) |

(52) U.S. Cl.
CPC ............... *H04L 47/10* (2013.01); *H04L 47/32* (2013.01); *H04L 47/34* (2013.01); *H04L 49/90* (2013.01); *H04L 49/9094* (2013.01); *H04L 47/283* (2013.01)
USPC ........................... 370/394; 370/230; 370/474

(58) Field of Classification Search
None
See application file for complete search history.

(56) References Cited

U.S. PATENT DOCUMENTS

| 5,996,067 A | 11/1999 | White |
| 6,026,477 A | 2/2000 | Kyker et al. |
| 6,147,996 A | 11/2000 | Laor et al. |

(Continued)

FOREIGN PATENT DOCUMENTS

| EP | 726680 | 8/1996 |
| EP | 1128609 | 8/2001 |

OTHER PUBLICATIONS

Bennett, J.C.R. et al., "Packet Reordering is not Pathological Network Behavior," IEEE/ACM Transactions on Networks, Dec. 1999, vol. 7, iss. 6, pp. 789-798.

(Continued)

*Primary Examiner* — Donald Mills
(74) *Attorney, Agent, or Firm* — Harrity & Harrity, LLP

(57) ABSTRACT

A reorder engine classifies information relating to incoming data items as belonging to either a first, second, or third region. The information relating to the data items may arrive at the reorder engine out of order. The data items each include a sequence number through which the reorder engine may reconstruct the correct order of the data items. Based on the classification, the reorder engine may either process the data items normally or drop certain ones of the data items. The majority of incoming data items will fall in the first region and are processed normally. Data items arriving in the second region indicate that a previous data item is late or delayed. If this previous data item is delayed but does eventually arrive, it will arrive in the third region and is simply ignored.

20 Claims, 7 Drawing Sheets

(56) References Cited

U.S. PATENT DOCUMENTS

| | | | |
|---|---|---|---|
| 6,246,684 B1 | 6/2001 | Chapman et al. | |
| 6,453,357 B1 | 9/2002 | Crow et al. | |
| 6,493,764 B1 | 12/2002 | Aldred et al. | |
| 6,578,105 B2 | 6/2003 | Finn et al. | |
| 6,741,603 B2 | 5/2004 | Pate et al. | |
| 6,781,992 B1 | 8/2004 | Rana et al. | |
| 6,781,998 B1 * | 8/2004 | Karlsson | 370/395.71 |
| 6,832,261 B1 | 12/2004 | Westbrook et al. | |
| 6,862,282 B1 | 3/2005 | Oden | |
| 6,937,606 B2 | 8/2005 | Basso et al. | |
| 7,072,342 B1 | 7/2006 | Elnathan | |
| 7,180,895 B2 | 2/2007 | Smith | |
| 7,209,482 B1 | 4/2007 | Rahim | |
| 7,613,192 B1 | 11/2009 | Rahim | |
| 2002/0031086 A1 | 3/2002 | Welin | |
| 2003/0012199 A1 * | 1/2003 | Ornes et al. | 370/394 |
| 2003/0012200 A1 | 1/2003 | Salamat | |
| 2003/0026277 A1 | 2/2003 | Pate et al. | |
| 2003/0039250 A1 | 2/2003 | Nichols et al. | |

OTHER PUBLICATIONS

Sharad, J. et al., "Measurement and Classification of Out-of Sequence Packets in a Tier-1 IP Backbone," IEEE Twenty-Second Annual Joint Conference of the IEEE Computer and Communications Societies, INFOCOM 2003, Mar.-Apr. 2003, vol. 2, pp. 1199-1209.

Co-pending U.S. Appl. No. 12/565,568, filed Sep. 23, 2009, entitled "Reorder Engine With Error Recovery" Rami Rahim, 34 pages.

* cited by examiner

REORDER ENGINE WITH ERROR RECOVERY

RELATED APPLICATIONS

This application is a continuation of U.S. patent application Ser. No. 12/565,568 filed Sep. 23, 2009, which is a continuation of U.S. patent application Ser. No. 11/684,394 filed Mar. 9, 2007, now U.S. Patent No. 7,613,192, which is a continuation of U.S. patent application Ser. No. 10/024,553 filed Dec. 21, 2001, now U.S. Pat. No. 7,209,482, the entire contents of which are incorporated by reference herein.

BACKGROUND OF THE INVENTION

A. Field of the Invention

The present invention relates generally to data processing and, more particularly, to reordering of information that arrives out of order after transmission.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed. Purpose-built routers are designed and built with components optimized for routing. They not only handled higher line rates and higher network traffic volume, they also added functionality without compromising line rate performance.

A purpose-built router may include a number of input and output ports from which it transmits and receives information packets. A switching fabric or other transmission medium may be implemented in the router to carry the packets between the ports. In a high-performance purpose-built router, the switching fabric may transmit a large amount of information between a number of internal components. Typically, the information is transmitted in discrete quantities called packets, or broken down even further into a series of cells.

One property of the switching fabric is that, even though it may have enough bandwidth to handle its cell traffic, cells transmitted to a particular destination may arrive at that destination out of order. Thus, although a first cell may be transmitted before a second cell, the second cell may be received before the first cell. Generally, the order of the received cells is important and should be preserved.

Reorder circuits may be used to reorder cells received from a particular source into their correct transmission order. Essentially, each cell, as it is transmitted from a source, is appended with a sequence number. The reorder circuits examine the received sequence numbers to determine the correct cell order.

One implementation of a reorder circuit is as a circular buffer in which arriving cells are placed at positions in the buffer based on the cell's sequence number. A pointer register keeps track of the rear-most position in the buffer. When a cell arrives that corresponds to the position in the pointer register, the reorder circuit increments the pointer value to point to the next open position in the buffer and processes all cells between the old pointer position and the new pointer position.

Typically, out-of-order cells are received in a relatively close sequence to their true order. Occasionally, however, a cell may arrive that is significantly out-of-order (e.g., the cell is delayed much more than normal). Designing a reorder circuit to be able to reorder such pathological worst case conditions can significantly increase the memory size requirements of the reorder circuit.

Thus, there is a need in the art for reorder circuits to be able to effectively handle worst case out-of-order scenarios.

SUMMARY OF THE INVENTION

Structure and processes consistent with the principles of the invention, among other things, efficiently reorder information streams that occasionally include highly out-of-order data items.

In one aspect consistent with the principles of the invention, a reordering device includes a reorder buffer, a reorder buffer pointer, and a reorder engine. The reorder buffer stores information relating to data items, each of the data items including a sequence number chosen from a sequence number space and that indicates a relative order of the data items. The reorder buffer pointer indicates a rearmost active entry of the reorder buffer relative to the sequence number space. The reorder engine classifies data items based on the sequence number of the data item and the value of the reorder buffer pointer. Further, the reorder engine determines whether to store the data items in the reorder buffer based on the classification.

A second aspect of the invention is directed to a method of ordering data items. The method includes receiving the data items, where the received data items are associated with a sequence number chosen from a sequence number space. The sequence number indicates a relative order of the data items. The method classifies the received data items as one of a number of possible classifications based on the sequence number of the data items and a value that defines a position of a reorder buffer in the sequence number space. The data items are processed based on the classifications.

Another aspect of the invention is directed to a network device including a data transmission component and processing elements connected by the data transmission component. The processing elements communicate with one another by transmitting data items over the data transmission component. The processing elements each include a reorder component configured to arrange received data items into an order corresponding to an order in which the data items were transmitted. Each of the reorder components includes a reorder buffer and a reorder engine. The reorder buffer stores the data items, each of which includes a sequence number chosen from a sequence number space. The sequence number indicates the order of the data items. Further, the reorder engine classifies the data items based on the sequence number of the data items and based on a position of the reorder buffer relative to the sequence number space, and the reorder engine determines whether to store the data items in the reorder buffer based on the classification of the data item.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, a reorder engine places data items of a received stream into the order in which they were transmitted. The reorder engine uses a reorder buffer to store incoming data items in a buffer location determined by a sequence number contained in the data items. Incoming data units are classified by the reorder engine into one of three different regions depending on the data item's sequence number. Data items in the first region are inserted into the buffer. Data items in the second region are inserted into a shifted version of the buffer. Data items in the third region are considered non-recoverable errored data items and are dropped.

System Description

Figure 1:
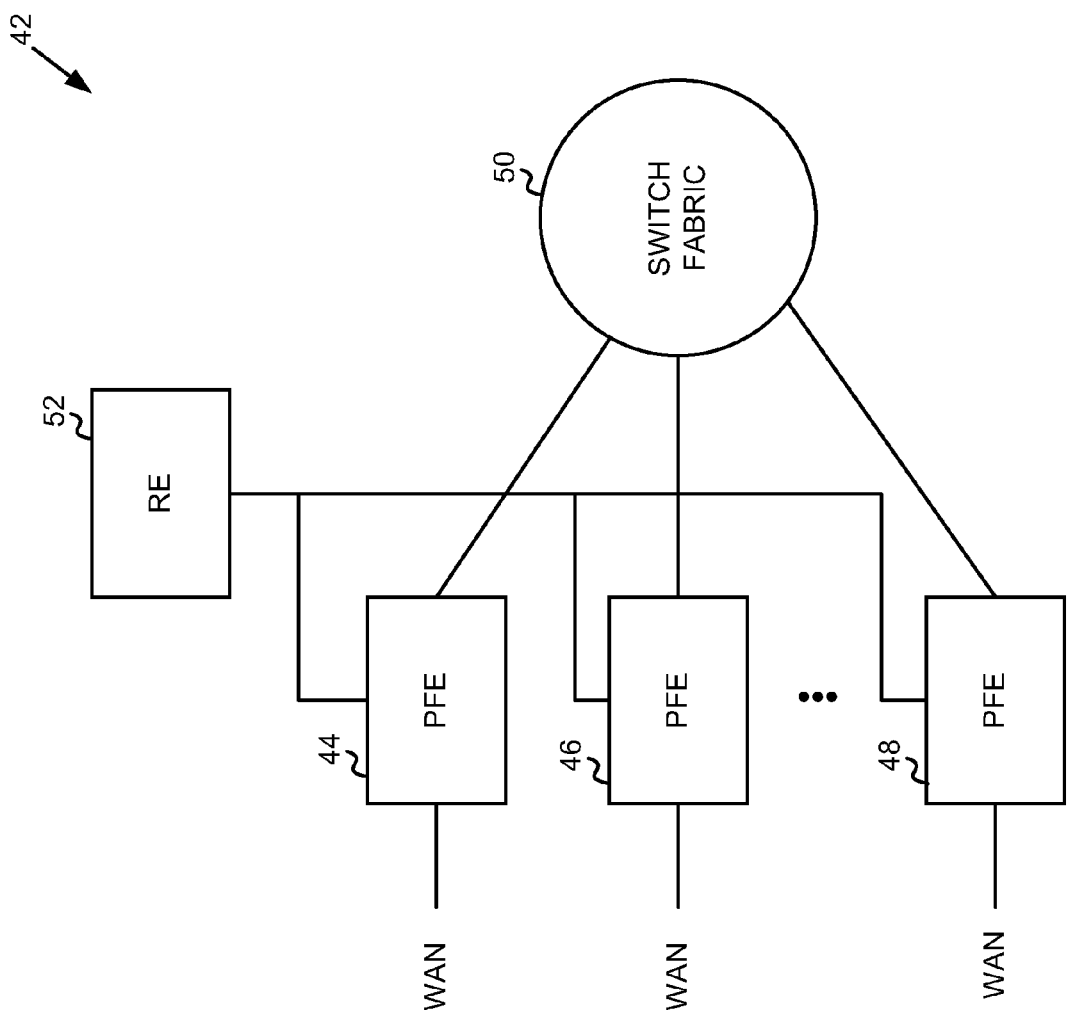
FIG. 1 is a block diagram illustrating an exemplary routing system in which systems and methods consistent with the principles of the invention may be implemented.

FIG. 1 is a block diagram illustrating an exemplary routing system 42 in which the principles of the present invention may be implemented. System 42 includes packet forwarding engines (PFEs) 44, 46 . . . 48, a switch fabric 50, and a routing engine (RE) 52. System 42 receives a data stream from a physical link, processes the data stream to determine destination information, and transmits the data stream out on a link in accordance with the destination information.

RE 52 performs high-level management functions for system 42. For example, RE 52 communicates with other networks and systems connected to system 42 to exchange information regarding network topology. RE 52 creates routing tables based on network topology information, creates forwarding tables based on the routing tables, and forwards the routing tables to PFEs 44, 46, and 48. The PFEs use the routing tables to perform route lookups for incoming packets. RE 52 also performs other general control and monitoring functions for system 42.

PFEs 44, 46, and 48 are each connected to RE 52 and switch fabric 50. PFEs 44, 46, and 48 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 44 will be used, by way of example, to discuss the operations performed by PFEs 44, 46, and 48 consistent with the principles of the invention. PFE 44 processes incoming data by stripping off the data link layer. PFE 44 converts header information from the remaining data into a data structure referred to as a notification.

For example, in one embodiment, the data remaining after the data link layer is stripped off is packet data. PFE 44 converts the layer 2 (L2) and layer 3 (L3) packet header information included with the packet data into a notification. PFE 44 stores the notification, some control information regarding the packet, and the packet data in a series of cells. In one embodiment, the notification and the control information are stored in the first two cells of the series of cells. The cells may be discrete instructions each having header and possibly trailer fields, or may simply be a bit stream processed in 64-byte segments.

PFE 44 performs a route lookup using the notification and the forwarding table from RE 52 to determine destination information. PFE 44 may also process the notification to perform protocol-specific functions, policing, and accounting, and might even modify the notification to form a new notification.

If the determined destination indicates that the packet should be sent out on a physical link connected to PFE 44, then PFE 44 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 50, then PFE 44 retrieves the cells for the packet, modifies the first two cells with the new notification and new control information, if necessary, and sends the cells to the other PFE via switch fabric 50. Before transmitting the cells over switch fabric 50, PFE 44 appends a sequence number to each cell, which allows the receiving PFE to reconstruct the order of the transmitted cells. The receiving PFE reconstructs the cells in to their correct order and reconstructs the packet using the packet data from the cells, and sends the packet out on the port associated with the appropriate physical link of the receiving PFE.

In summary, RE 52, PFEs 44, 46, and 48, and switch fabric 50 perform routing based on packet-level processing. The PFEs store each packet using cells while performing a route lookup using a notification, which is based on packet header information. A packet might be received on one PFE and go back out to the network on the same PFE, or be sent through switch fabric 50 to be sent out to the network on a different PFE.

Figure 2:
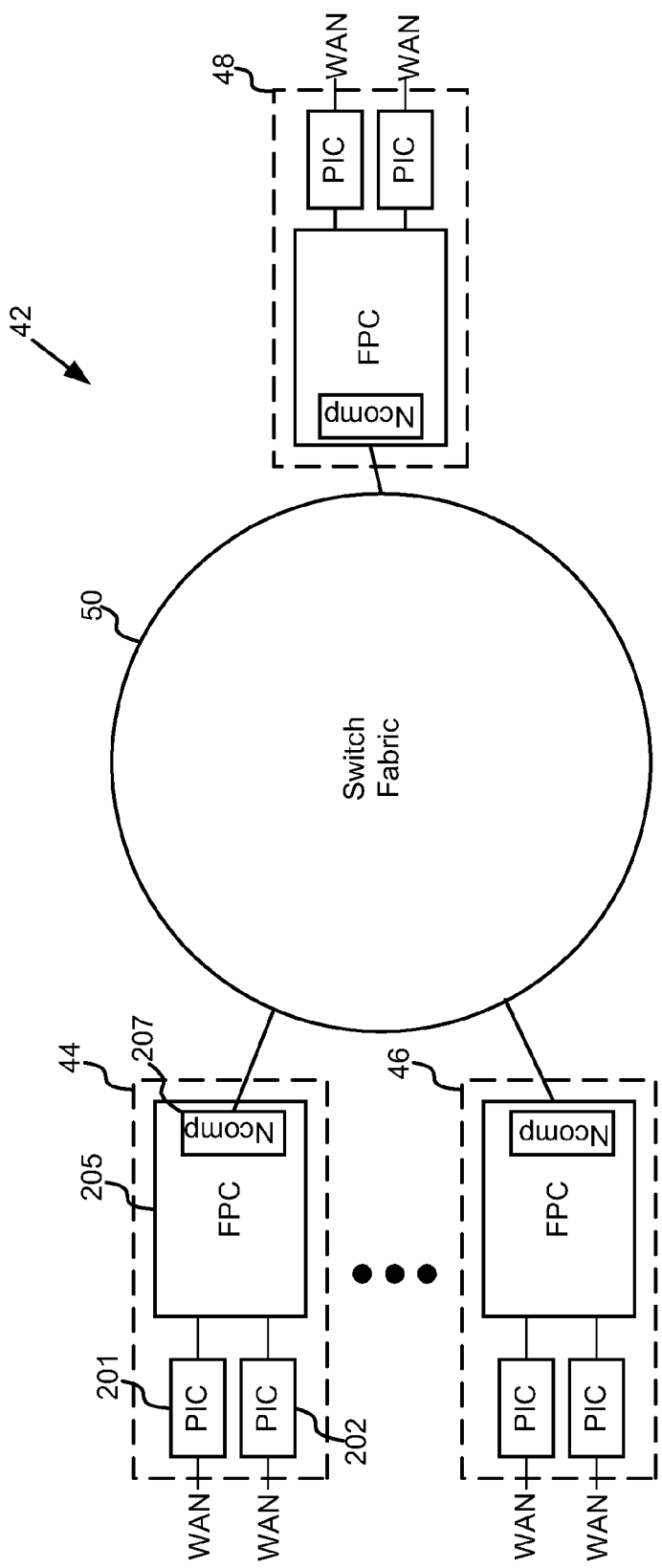
FIG. 2 is a detailed block diagram illustrating portions of the routing system shown in FIG. 1.

FIG. 2 is detailed a block diagram illustrating portions of routing system 42. PFEs 44, 46, and 48 connect to one another through switch fabric 50. Each of the PFEs may include one or more physical interface cards (PICs) 201-202 and flexible port concentrators (FPCs) 205.

PICs 201 and 202 may transmit data between a WAN physical link and FPC 205. Different PICs may be designed to handle different types of WAN physical links. For example, PIC 201 may be an interface for an optical link while PIC 202 may be an interface for an Ethernet link. Although FIG. 2 shows two PICs connected to the FPCs, in other embodiments consistent with principles of the invention there can be more or fewer PICs connected to an FPC.

FPCs, such as FPC 205, handle packet transfers to and from PICs 201 and 202, and switch fabric 50. For each packet it handles, FPC 205 performs the previously discussed route lookup function. FPCs 205 communicate with switch fabric 50 through a fabric communication component 207 (labeled as Ncomp). Communication component 207 handles the protocols associated with transmitting cells to and receiving cells from switch fabric 50. In one embodiment, switch fabric 50 supports 144 communication components, implemented in 144 FPCs 205.

As previously mentioned, cells transmitted by a source communication component 207 over switch fabric 50 may be received out of order at the destination communication component. The destination communication component reorders the received cells into their appropriate order.

Reorder Component

Figure 3:
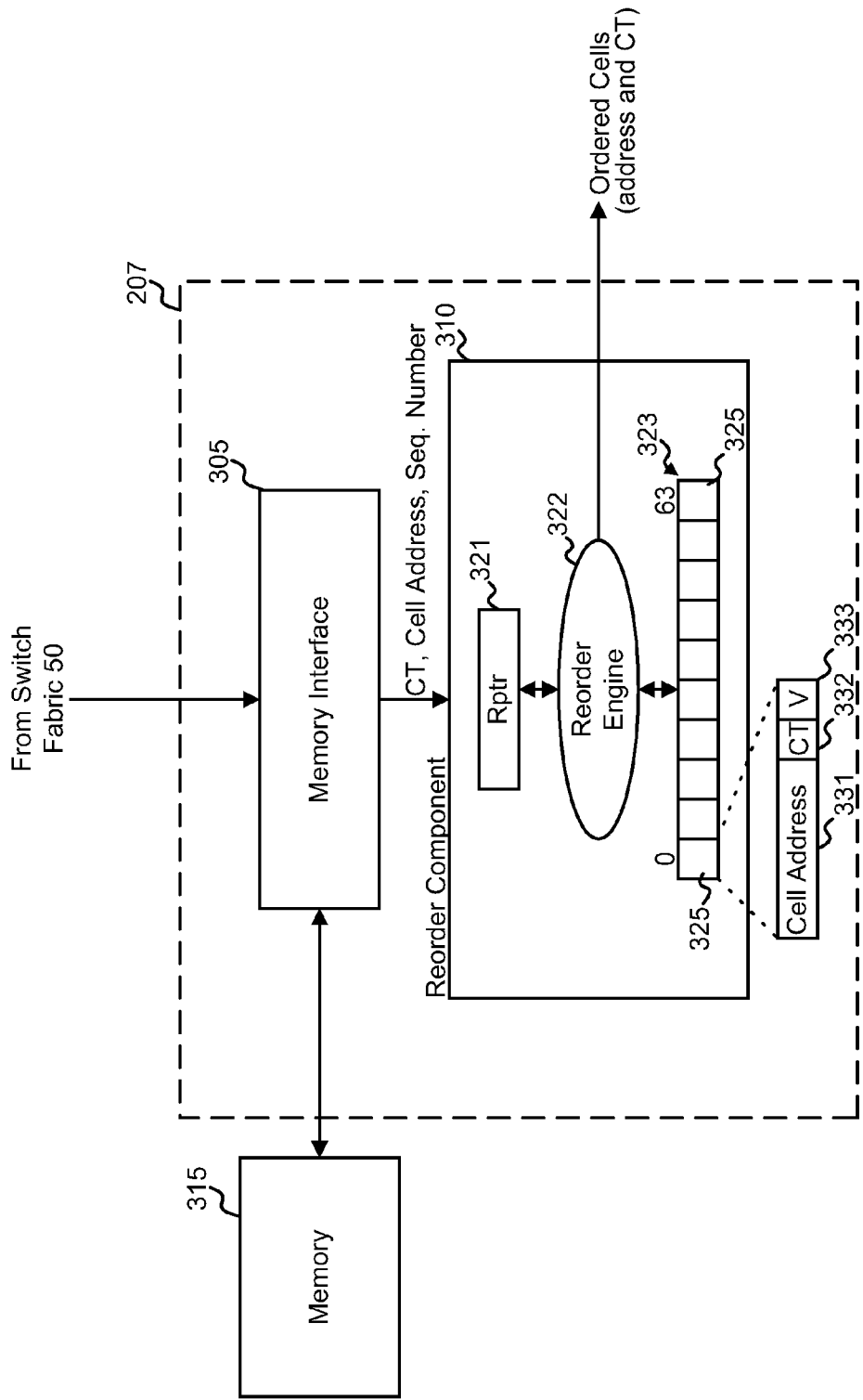
FIG. 3 is a diagram illustrating portions of the communication component illustrated in FIG. 2 and relating to the reception and reordering of data cells.

FIG. 3 is a diagram illustrating portions of communication component 207 relating to the reception and reordering of data cells (or more generally, any unit of data) from switch fabric 50. Communication component 207 includes a memory interface 305 and a reorder component 310. Communication component 207 stores received cells in external memory 315. In one embodiment, memory 315 is a distributed memory.

Cells from switch fabric 50 are received at memory interface 305, which extracts basic cell identification information from the received cells. In one embodiment, each cell is labeled with a cell type (CT) identifier, such as "FC" (first cell of packet), "SC" (second cell of packet), "MC" (a middle cell of a packet), and "LC" (last cell of a packet). Memory interface 305 extracts this cell type identifier and the sequence number from the received cells, and stores the remaining portion of the cell in memory 315. Reorder component 310 receives the cell type identifier, the cell address in memory 315, and the sequence number from memory interface 305. Based on these three pieces of cell identification information, reorder component 310 determines the correct order for the incoming cells and outputs, in the correct cell order, each cell's address information.

Reorder component 310 includes a reorder pointer (Rptr) register 321 (Rptr), reorder engine 322, and a reorder buffer 323. Reorder engine 322 places cell information into reorder buffer 323 based on the cell sequence number and the value in Rptr 321.

In one embodiment, reorder buffer 323 is an array of 64 entries (labeled as entries 325). Each entry 325 stores information corresponding to a cell (or, more generally, any data unit) from reorder engine 322. One of entries 325 (entry zero) is shown in detail in FIG. 3, and, may store the cell address 331, cell type 332, and validity state 333 of the cell. Validity state 333 may be stored as a valid ("V") bit that indicates whether there is valid information in the corresponding entry. A "1," for example, may indicate that the entry contains valid cell information while a "0" may indicate that the entry is empty.

Reorder buffer 323 is implemented as a circular buffer. Rptr 321 stores a value that points to the rearmost active entry in reorder buffer 323. New cells are written to reorder buffer 323 within an active window of entries that begins at the entry referenced by Rptr 321 and extends through a predetermined number of entries (e.g., all 64 entries). Reorder engine 322 determines the location to write the new cells in reorder buffer 323 based on the cell sequence number. When a cell is received which has a sequence number that corresponds to the value of Rptr (i.e., the cell belongs at the rearmost active entry in reorder buffer 323), reorder engine 322 processes the received cell as the next cell in the correct order of received cells. The processing may include outputting cell address 331 and cell type 322, and clearing cell validity bit 333. Reorder engine 322 may then increment Rptr. Because reorder buffer 323 is a circular buffer, Rptr 321 wraps around to the first entry in the reorder buffer 323 after reaching the last entry in the reorder buffer 323.

Figure 4:
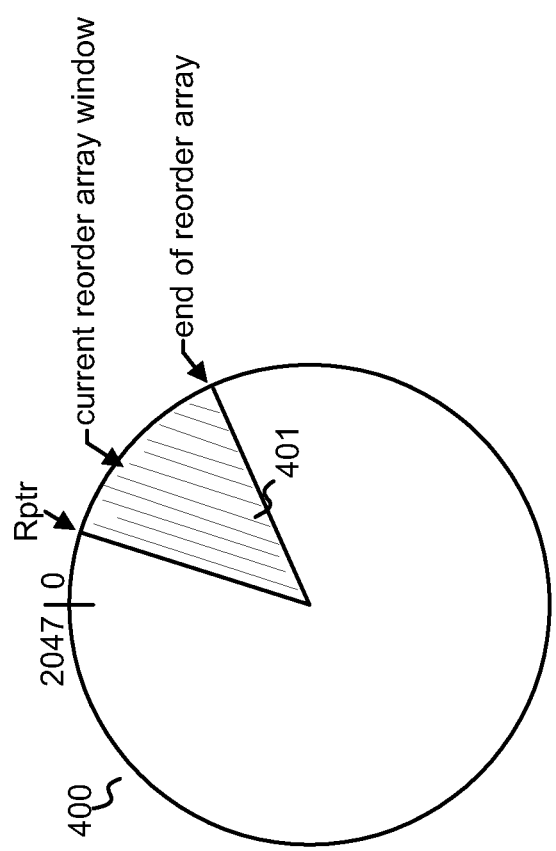
FIG. 4 is a diagram that conceptually illustrates the relationship between the entries in a reorder buffer and sequence numbers associated with received cells.

FIG. 4 is a diagram that conceptually illustrates the relationship between the entries in reorder buffer 323 and the sequence numbers associated with received cells. As previously mentioned, transmitting devices append a sequence number to cells transmitted through switch fabric 50. The range of possible sequence numbers, called the sequence number space, is larger than the size of reorder buffer 323. In the embodiment illustrated in FIG. 4, the sequence number space is 2048 possible numbers (the complete circle 400). Thus, a transmitting device may append the sequence number zero to its first transmitted cell, sequence number one to the second transmitted cell, etc., up through sequence number 2047. The next appended sequence number will again be zero.

The active window defined by reorder array 323 is illustrated by slice 401 of circle 400. As Rptr is incremented, slice 401 moves clockwise around the circle.

Because the number of available sequence numbers can be much greater than the number of entries 325 in reorder buffer 323 (e.g., 64 entries in the reorder buffer and 2048 possible numbers in the sequence space), the appropriate address in the reorder buffer 323 (e.g., zero to 63) to store a cell is based on a modulo operation. Specifically, reorder engine 322 calculates the physical address in buffer 323 based on the sequence number modulo the number of entries in the buffer memory. Thus, in the example given above, the reorder engine calculates the address in reorder buffer 323 as the sequence number module 64.

In normal operation, the sequence number of incoming cells falls within slice 401. Whenever a cell is received at Rptr 321, reorder engine 322 processes that cell as the next in-sequence cell and increments Rptr, which effectively slides slice 401 one position clockwise in sequence space 400. Occasionally, however, a sequence number will arrive that is outside of slice 401. In this situation, reorder engine 322 handles the cell based on where in the sequence number space, relative to slice 401, the cell arrives. More specifically, consistent with principles of the invention, reorder engine 322 classifies each incoming cell as belonging to one of three regions.

Figure 5B:
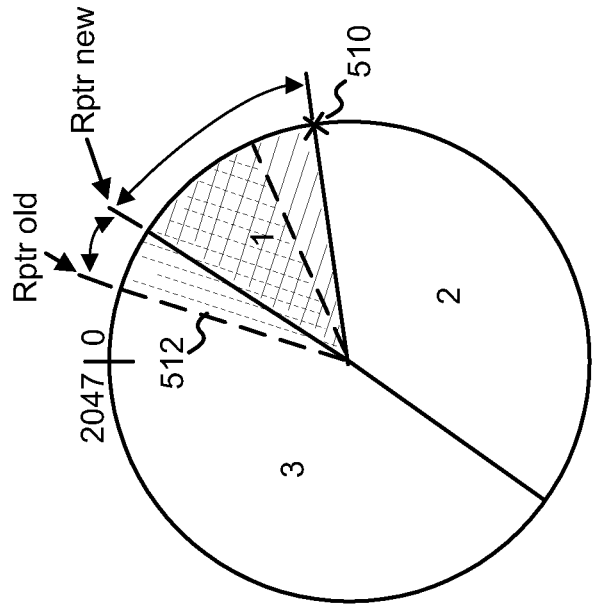
FIGS. 5A and 5B are diagrams conceptually illustrating regions to which the reorder engine classifies received cells.
Figure 5A:
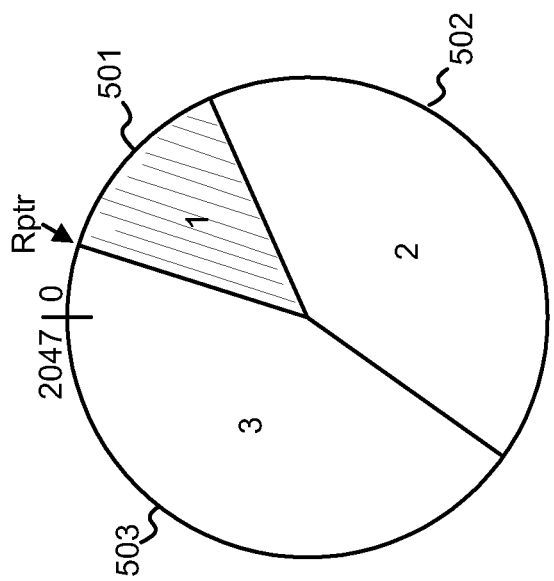

FIGS. 5A and 5B are diagrams conceptually illustrating the three regions to which reorder engine 322 classifies each cell. The first region, labeled as region 501, maps to the physical reorder buffer 323. The second region, labeled as region 502, lies ahead (in the sequence number space) of the first region. The third region, labeled as region 503, lies just behind the first region. Stated differently, the second region extends for a predetermined count of sequence numbers (e.g., 100) after first region 501, while the third region encompasses the rest of the sequence space.

In general, reorder engine 322 classifies incoming cells as belonging to one of the three regions 501, 502, or 503, based on the sequence number associated with the cells, and handles the received cells differently based on the classification.

Figure 6:
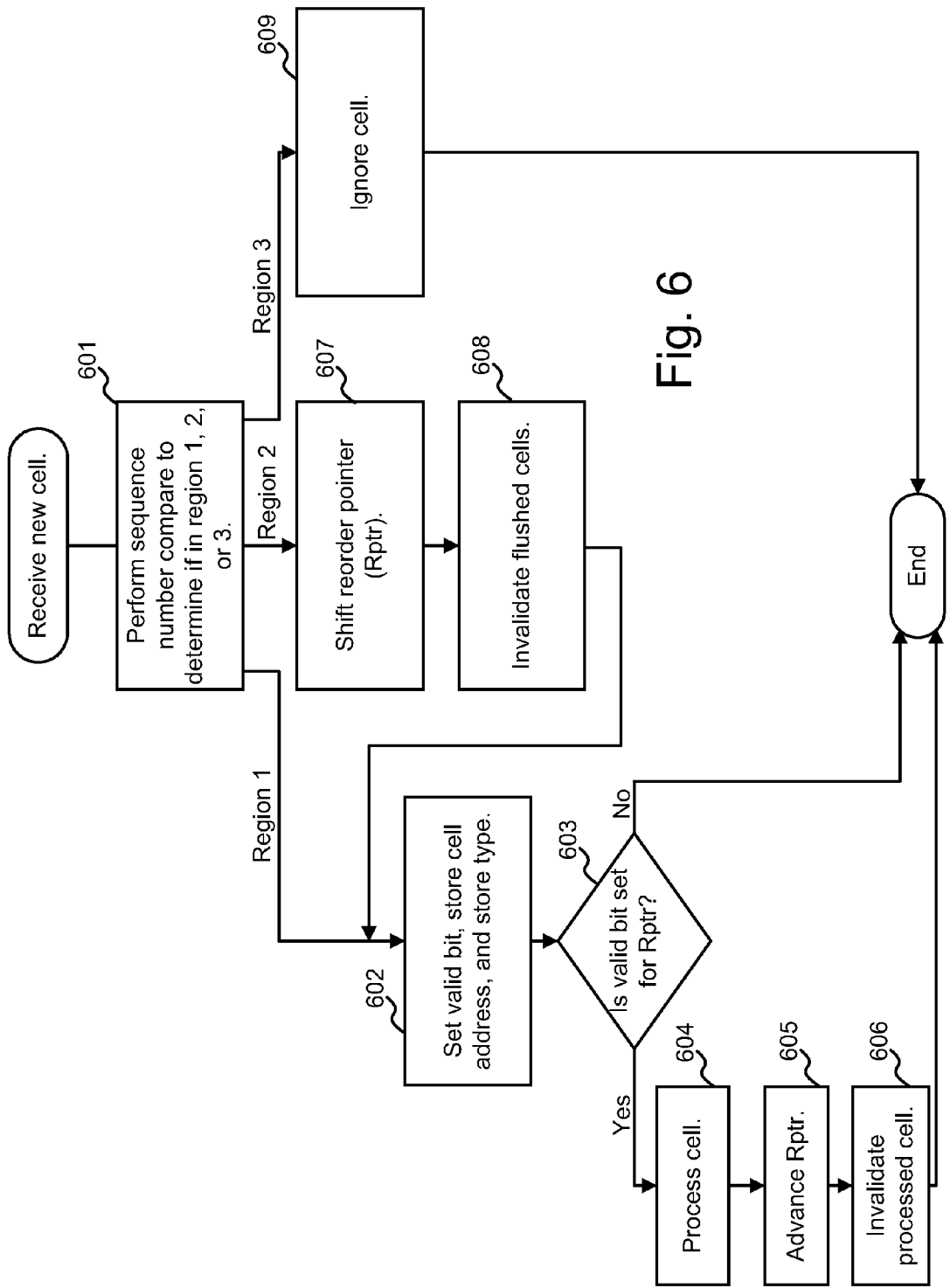
FIG. 6 is a flow chart illustrating operation of the reorder engine in handling received cells.

FIG. 6 is a flow chart illustrating operation of the reorder engine 322 in handling received cells based on their region classification.

For each received cell, reorder engine 322 examines the cell's sequence number and determines if the cell is in first region 501, second region 502, or third region 503 (act 601). Generally, the cell will belong to the first region. In this situation, reorder engine 322 stores the cell information in the appropriate entry in reorder buffer 323. More specifically, reorder engine 322 sets the valid bit corresponding to the cell and stores the cell address and cell type information in reorder buffer 323 (act 602). If the valid bit is set for the cell corresponding to Rptr, reorder engine 322 processes that cell by outputting the cell address for the cell (acts 603 and 604). Reorder engine 322 then advances Rptr 321 and resets the valid bit corresponding to the processed cell (acts 605 and 606).

A cell arriving in the second region has arrived too early with respect to its logically neighboring cells. In this situation, reorder engine 322 advances Rptr just enough so that the last entry in reorder buffer 323 accommodates the new cell (acts 601 and 607). Alternatively, reorder engine 322 advances Rptr just enough so that the last entry in reorder buffer 323 accommodates the new cell and the cell referenced by Rptr is of cell type FC (first cell). In either case, this effectively shifts the window defined by the reorder buffer in the sequence space. This shifting is illustrated graphically in FIG. 5B.

Referring to FIG. 5B, assume that a new cell arrives with a sequence number that places it at position "x" 510. Reorder engine 522 shifts Rptr in the global sequence number space so that the new region just reaches newly arriving cell 510. Cells in the reorder engine that were skipped (in slice 512) are invalidated (act 608). The invalidation can be performed by clearing valid bits 333 of the invalidated cells. At this point, reorder engine 322 continues operating as if the new cell had arrived in the first region and perform Acts 602-606.

A cell arriving in the third region has arrived too late and is ignored by the reorder engine (act 609).

In the event of a flush of shifted region 512 (act 608), reorder engine 322 invalidates valid bits 333 corresponding to each flushed cell. In some implementations, however, discarding a received cell may require more than simply resetting a valid bit. For example, the system may need to signal memory 315 that the memory allocated to the discarded cell can be reclaimed. In this situation, due to the latency associated with deallocating memory, it may be infeasible to perform Act 608 for a large number of flushed cells without delaying later portions of the system.

Figure 7:
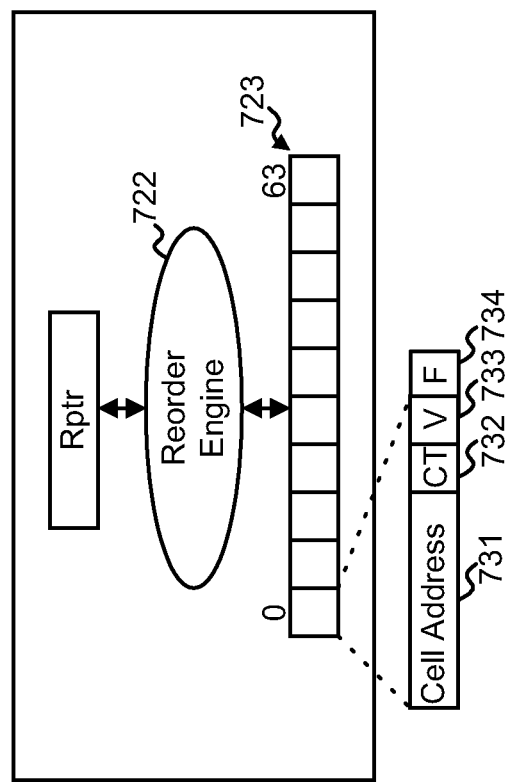
FIG. 7 is a diagram illustrating a reorder engine and a reorder buffer consistent with an alternate embodiment of the invention.

FIG. 7 is a diagram illustrating a reorder engine 722 and a reorder buffer 723 for discarding multiple cells for situations in which it may not be feasible to simultaneously discard multiple cells. In a manner similar to reorder buffer 323, entries in reorder buffer 723 are associated with a cell address 731, a cell type field 732, and a valid field 733. Additionally, each entry is associated with a flush ("F") bit 734. In operation, reorder engine 722 may perform the acts described above. However, when invalidating a cell, reorder engine 722, in addition to resetting valid field 733 corresponding to the cell, sets flush bit 734 that corresponds to the cell. A set flush bit indicates that additional processing, such as reclaiming memory associated with the cell, is still to be performed. Reorder engine 722 may perform this additional processing at any convenient time. For example, when a new cell arrives and is placed in reorder buffer 723, reorder engine 722 may clear the flush bit and reclaim the memory associated with the previously invalidated cell. Because only one cell can arrive at any particular time, this technique automatically serializes memory recovery.

SUMMARY

By classifying incoming cells as belonging to either the first, second, or third region, reorder engine 322 can effectively handle error conditions. In normal operation, the vast majority of incoming cells will fall in the first region and can thus be processed normally. Cells arriving in the second region indicate that a previous cell is late or delayed. If this previous cell is delayed but does eventually arrive, it will arrive in the third region and is simply ignored.

Although described in the context of a purpose-built router, concepts consistent with the principles of the invention can be implemented in any system that requires high performance data item processing. Apparatus, systems, and methods based on the principles of the pipeline engine described herein may be used in any environment for sequencing data items associated with an entity.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although memory 315 was described as being implemented externally from reorder component 310, memory 315 may be integrated with reorder component 310.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents

What is claimed:
1. A network device comprising:
a memory to:
store information associated with a plurality of data units received by the network device,
the information associated with the plurality of data units being stored based on a relative order associated with a transmission of each data unit of the plurality of data units, to the network device; and
a component, at least partially implemented in hardware, to:
determine whether a position, in the relative order, associated with a first data unit, the plurality of data units, is included within a first range of positions in the relative order or a second range of positions in the relative order,
the second range of positions extending a particular quantity of positions from a first position of the first range of positions, and
the second range of positions not being included in the first range of positions;
store, when the position is included in the first range of positions, information associated with the first data unit in a portion of the memory associated with the first range of positions; and
when the position is included in the second range of positions:
shift the first range of positions to form a shifted first range of positions,
the position comprising a first position of the shifted first range of positions, and
at least one position, included in the first range of positions, not being included in the shifted first range of positions;
store the information associated with the first data unit in a portion of the memory associated with the first position of the shifted first range of positions; and invalidate at least a second data unit of the plurality of data units,
information associated with the at least the second data unit being stored in a portion of the memory associated with the at least one position.

2. The network device of claim 1, where, when the position is included in the second range of positions, the component is further to:
invalidate portions of the memory associated with a third range of positions,
the third range of positions including the at least one position, and
the third range of positions including positions, in the relative order, between a last position of the first range of positions and a last position of the shifted first range of positions.

3. The network device of claim 1, where the component is further to:
discard, when the position is not included in the first range of positions or the second range of positions, the first data unit.

4. The network device of claim 1, where, when invalidating the second data unit, the component is to:
clear a valid bit associated with an entry in the memory corresponding to the at least one position.

5. The network device of claim 1, where, when invalidating the second data unit, the component is to:
set a flush bit associated with an entry in the memory corresponding to the at least one position.

6. The network device of claim 2, where the component is further to:
serialize recovery of the portions of the memory associated with the third range of positions.

7. The network device of claim 6, where the component is further to:
serialize the recovery of the portions of the memory associated with the third range of positions based on one or more flush bits associated with the portions of the memory associated with the third range of positions.

8. A method comprising:
receiving, by a network device, a plurality of data units;
for each data unit, of the plurality of data units:
determining, by the network device, whether a position, in a relative order associated with a transmission of the data unit to the network device, is included in a first range of positions of the relative order or a second range of positions of the relative order;
the second range of positions extending a particular number of positions from a first position of the first range of positions, and
the second range of positions not being included in the first range of positions;
storing, by the network device and when the position is included within the first range of positions, information associated with the data unit in a portion, of a memory, associated with the first range of positions;
when the position is included in the second range of positions:
shifting, by the network device, the first range of positions to form a shifted first range of positions, the position comprising a first position of the shifted first range of positions, and
at least one position, in the first range of positions, not being included in the shifted first range of positions;
storing, by the network device, the information associated with the data units data unit in a portion of the memory associated with the first position of the shifted first range of positions; and
invalidating, by the network device, another data unit of the plurality of data units,
information associated with the other data unit being stored in a portion of the memory associated with the at least one position.

9. The method of claim 8, further comprising:
invalidating, based on shifting the first range of positions, portions of the memory associated with a third range of positions,
the third range of positions including the at least one position, and
the third range of positions including positions, in the relative order, between a last position of the first range of positions and a last position of the shifted first range of positions.

10. The method of claim 8, further comprising:
discarding, when the position determined for the data unit is not included in the first range of positions or the second range of positions, the data unit.

11. The method of claim 8, where invalidating the other data unit includes:
clearing a valid bit associated with an entry in the memory corresponding to the at least one position.

12. The method of claim 8, where invalidating the other data unit includes:
setting a flush bit associated with an entry in the memory corresponding to the at least one position.

13. The method of claim 9, further comprising:
serializing a recovery of the portions of the memory associated with the third range of positions.

14. The method of claim 13, where serializing the recovery of the portions of the memory associated with the third range of positions includes:
serializing the recovery of the portions of the memory associated with the third range of positions based on one or more flush bits associated with the portions of the memory associated with the third range of positions.

15. A non-transitory memory device storing instructions, the instructions comprising:
one or more instructions which, when executed by a network device, cause the network device to:
determine whether a position of a first data unit, of a plurality of data units received by the network device, in a relative order associated with a transmission of each data unit, of the plurality of data units,. to the network device is included within a first range of positions in the relative order or within a second range of positions in the relative order,
the second range of positions extending a particular number of positions from a first position of the first range of positions, and
the second range of positions not being included in the first range of positions;
store, when the position is included within the first range of positions, information associated with the first data unit in a portion of the memory associated with the first range of positions; and
when the position is included in the second range of positions:
shift the first range of positions to form a shifted first range of positions,
the position comprising a first position of the shifted first range of positions, and at least one position, included in the first range of positions, not being included in the shifted first range of positions;

store the information associated with the first data unit in a portion of the memory associated with the first position of the shifted first range of positions; and invalidate a second data unit of the plurality of data units, information associated with the second data unit being stored in a portion of the memory associated with the at least one position.

16. The non-transitory memory device of claim 15, where the instructions further comprise:

one or more instructions which, when executed by the network device, cause the network device to invalidate, based on shifting the first range of positions, portions of the memory associated with a third range of positions, the third range of positions including the at least one position, and the third range of positions including positions, in the relative order, between a last position of the first range of positions and a last position of the shifted first range of positions.

17. The non-transitory memory device of claim 15, where the instructions further comprise:

one or more instructions which, when executed by the network device, cause the network device to discard, when the position is not included in the first range of positions or the second range of positions, the first data unit.

18. The non-transitory memory device of claim 15, where the one or more instructions to invalidate the second data unit include:

one or more instructions which, when executed by the network device, cause the network device to clear a valid bit associated with an entry in the memory corresponding to the at least one position.

19. The non-transitory memory device of claim 15, where the one or more instructions to invalidate the second data unit include:

one or more instructions which, when executed by the network device, cause the network device to set a flush bit associated with an entry in the memory corresponding to the at least one position.

20. The non-transitory memory device of claim 16, where the instructions further comprise:

one or more instructions which, when executed by the network device, cause the network device to serialize, based on one or more flush bits associated with the portions of the memory associated with the third range of positions, a recovery of the portions of the memory associated with the third range of positions.

* * * * *

UNITED STATES PATENT AND TRADEMARK OFFICE
CERTIFICATE OF CORRECTION

PATENT NO. : 8,879,560 B2  
APPLICATION NO. : 13/149269  
DATED : November 4, 2014  
INVENTOR(S) : Rami Rahim Page 1 of 1

It is certified that error appears in the above-identified patent and that said Letters Patent is hereby corrected as shown below:

In the Claims,

Please correct Claim 8 as follows:

Column 9, line 67, after "with the" delete "data units"

Signed and Sealed this
Eighteenth Day of August, 2015

Michelle K. Lee
*Director of the United States Patent and Trademark Office*